(12) United States Patent
Kho

(10) Patent No.: US 6,446,988 B1
(45) Date of Patent: Sep. 10, 2002

(54) EASY PULLING ROLLING COOLER

(76) Inventor: Dick T. Kho, P.O. Box 34454, West Los Angeles, CA (US) 90034

( * ) Notice: Subject to any disclaimer, the term of this patent is extended or adjusted under 35 U.S.C. 154(b) by 0 days.

(21) Appl. No.: 10/118,206

(22) Filed: Apr. 9, 2002

(51) Int. Cl.[7] .................................................. B62B 1/12
(52) U.S. Cl. ...................... 280/47.26; 16/405; 16/438; 16/900; 62/457.1; 280/655.1; 280/63
(58) Field of Search ........................... 16/405, 436, 900, 16/409, 438; 62/457.1, 457.7; 280/30, 47.24, 47.26, 47.315, 47.17, 47.371, 655, 655.1, 79.2, 37, 63

(56) References Cited

U.S. PATENT DOCUMENTS

| | | | | |
|---|---|---|---|---|
| 4,724,681 A | * | 2/1988 | Bartholomew et al. | .... 62/457.1 |
| 4,846,493 A | * | 7/1989 | Mason | ....................... 280/655 |
| 4,873,841 A | * | 10/1989 | Bradshaw et al. | ......... 62/457.1 |
| 5,228,706 A | * | 7/1993 | Boville | ....................... 280/655 |
| 5,373,708 A | * | 12/1994 | Dumoulin, Jr. | ............. 62/457.7 |
| 5,683,097 A | * | 11/1997 | Fenton et al. | ............. 280/655.1 |
| 5,803,472 A | * | 9/1998 | Lien | ........................ 280/47.26 |
| 6,311,991 B1 | * | 11/2001 | Conrado et al. | ......... 280/47.26 |

* cited by examiner

Primary Examiner—Michael Mar
(74) Attorney, Agent, or Firm—Monty Koslover

(57) ABSTRACT

An easily pulled, rolling cooler for storing refrigerables which can be manually towed by pulling a handle that is designed to resist torsion. The cooler has two wheels that are located directly under the cooler center of gravity to minimize pulling strain for the user. Provision is made for the handle to be folded down and stored on the cooler lid when not being used for towing. The cooler bottom is V-shaped, providing good ground clearance for the back end of the cooler when being towed over uneven ground. The cooler is light weight, compact and easily fitted in a car trunk or in a van for travel to picnics.

5 Claims, 5 Drawing Sheets

EASY PULLING ROLLING COOLER

BACKGROUND OF THE INVENTION

1. Field of the Invention

This invention relates to coolers for temporary storage of refrigerables, and in particular to a rolling cooler having attached wheels and a handle for pulling.

2. Background

Portable coolers, such as those typically used for storing cold cans of beer and soda for picnics, are usually light in weight unloaded and are designed to be carried. When fully loaded with cans and bottles, these coolers can prove to be heavy and awkward to carry any significant distance.

Some types of rolling coolers for temporary storage of refrigerables have been available for decades. These are mostly used by summertime street vendors, and range all the way from those set up on a tricycle wheel driven arrangement, to those which include two or four wheels and are manually pulled using an attached handle.

These known rolling coolers are usually designed for heavy usage and, as a result, are relatively heavy in weight and expensive to manufacture. They are also unsuitable in configuration for easy storage in the back of a car or light truck. There is thus a need for an inexpensive rolling cooler that can be easily pulled without undue strain on the hand and arm, over flat or uneven surfaces, and can be carried in the back of a car or light truck.

SUMMARY OF THE INVENTION

The invention is a rolling cooler for storing refrigerables that can be manually towed, using an attached pivoted pulling handle that is designed to resist torsion.

Two cooler wheels are located directly under the cooler center of gravity to minimize pulling strain for the user. Provision is made for the pulling handle to be stored on the lid of the cooler when not being used for towing. The cooler has thick walls for insulation, with the bottom wall being V-shaped to provide adequate ground clearance for the back end of the cooler when being towed on its two rubber tired wheels.

Accordingly, it is a prime object of the present invention to provide a rolling cooler that can be pulled easily without undue strain on the hand and arm of a user over flat or uneven ground.

An advantage of the present invention is low weight as compared with other available rolling coolers. Another advantage is the cooler compact storage form. when not in use. This facilitates storage of the cooler for travel or picnics, in the back a car or truck.

A further advantage is the relatively low cost of the cooler.

Further objects and advantages of the invention will be apparent from studying the following portion of the specification, the claims and the attached drawings.

DESCRIPTION OF THE PREFERRED EMBODIMENT

Figure 1:
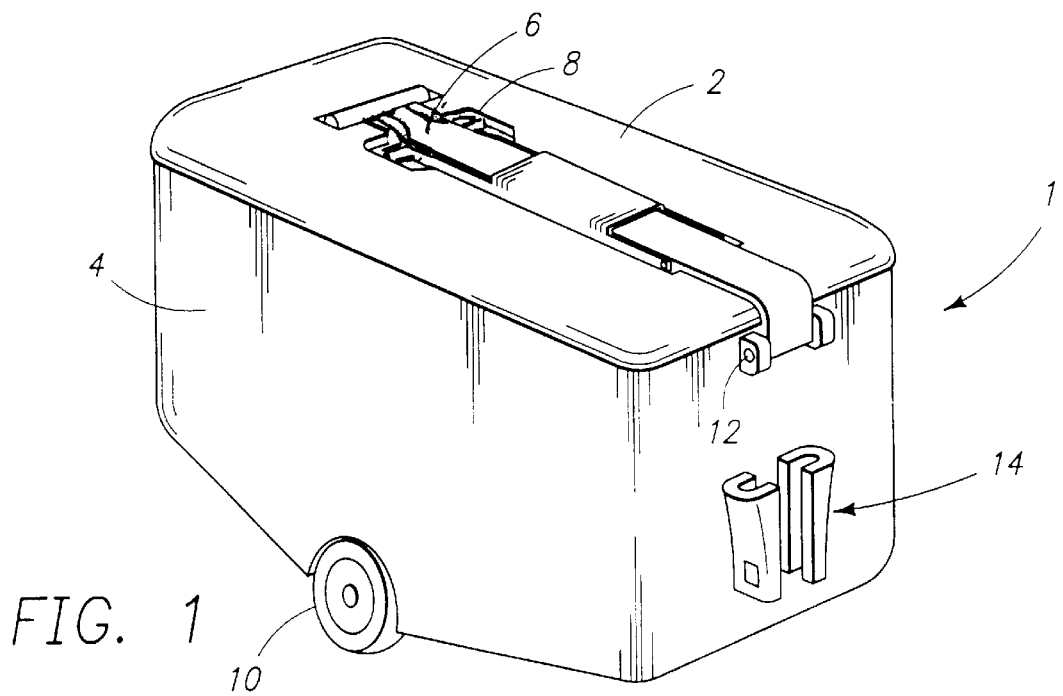
FIG. 1 is a perspective view of a pullable rolling cooler according to the present invention, particularly showing the pulling handle folded forward and stored in a groove in the top of the cooler lid.

Referring particularly to FIG. 1, there is shown a perspective view of a pullable, rolling cooler 1 according to the present invention, which is shown in a stationary mode, with its pulling handle stored in the cooler lid 2 on top of the cooler case 4. The handle 6 has one end attached pivotally to a mounting plate 12 at the front end of the case 4, and is stored, removably fastened to a groove 8 which is cut in the lid 2. A slotted latching plate 14 is attached to the front end of the case 4 and serves to secure the handle 6 rigidly in position when extended. Two rubber tired wheels 10 on an axle fixed to the bottom portion of the case 4, support the stationary cooler 1.

In this condition, the lid 2 can be lifted off the top of the case 4, with the attached handle 6 pivoting on its mounting plate 12, for full access to the case contents.

Figure 2:
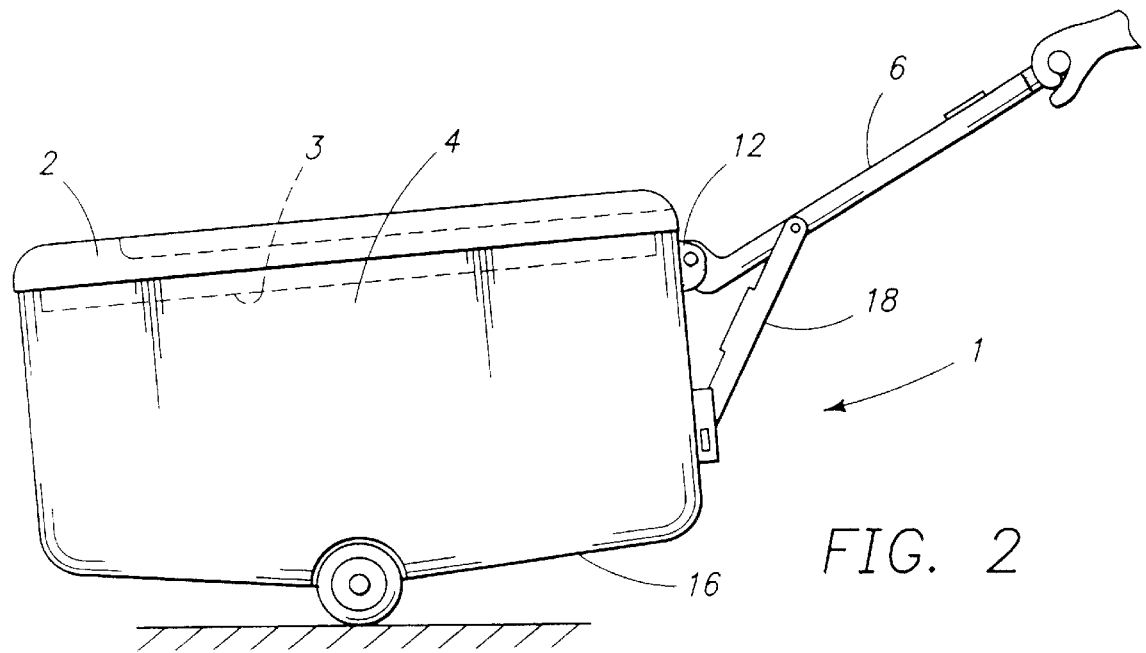
FIG. 2 is a side elevation view of the invention cooler being pulled, particularly showing the handle fixed rigidly to the cooler case for pulling, and the cooler V-shaped bottom surface having good ground clearance.

In FIG. 2, the cooler 1 is shown being pulled by its handle 6, which is braced rigidly by a strut assembly 18 that pivots on the handle 6 at one end and locks in to the latching plate 14 on its distal end. It should be noted that the bottom portion 16 of the case 4 is V-shaped, and the wheels 10 are located at the center of the V which corresponds approximately to the cooler center of gravity. There is therefore good ground clearance for the back end of a cooler when being pulled, while the wheels 10 carry most of the cooler weight. Because of this design, relatively little weight and strain is transmitted through the handle 6 for pulling by a user.

The lid 2 is secured to the case 4 by a stepped portion 3 on the lid underside, which projects into the top of the case cavity and fits closely to the inside surface of the case walls.

Figure 3:
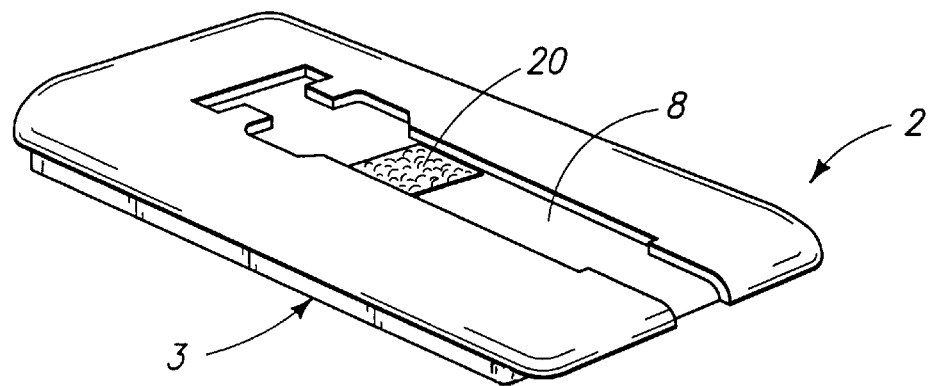
FIG. 3 is a perspective view of the invention cooler lid, particularly showing the cut-out grooved portion for storing the handle.
Figure 4:
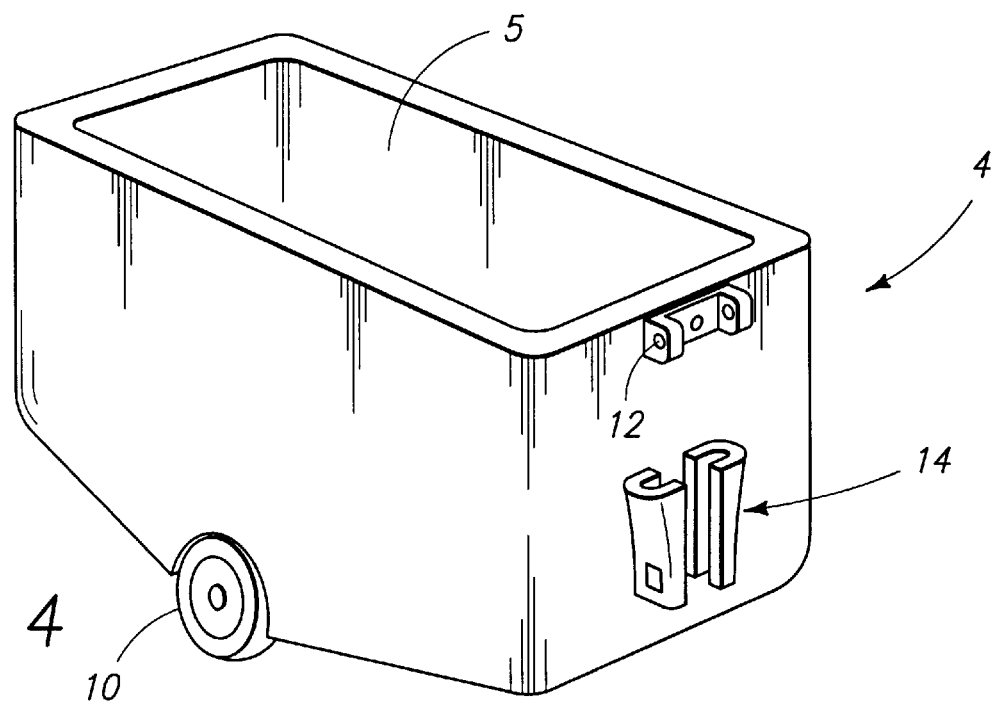
FIG. 4 is a perspective view of the invention cooler case, particularly showing a pivotal mounting plate for the handle and a latch plate fastened to the front end of the cooler case.

Refer now to FIGS. 3 and 4 which are respectively, perspective views of the lid 2and the case 4. Both the lid 2 and the case 4 are fabricated using rigid, molded foamed plastic with a smooth outer surface. This material provides good thermal insulation properties to protect the contents of a cooler, in addition to being light in weight and sturdy. As an alternative, a light weight composite material could be used for the,case 4 and lid 2.

A deep groove 8 is cut and shaped in the top surface of the lid 2 to store the handle 6 with its strut assembly 18 folded flat against the sides of the handle. The handle 6 is held in the groove 8 by a fastener patch 20 of hook-loop synthetic material that is adhered to the floor of the groove 8. A mating fastener patch of hook-loop synthetic material is also attached to the handle 6, and located so that the fastener patch on the handle will engage the fastener patch on the floor of the groove 8 in the lid 2 when the handle 6 is rotated and nested in the groove. The fastener patches can be easily disengaged from each other when desired, and the handle 6 may be removed from the groove for pulling the cooler.

The case 4 has thick walls surrounding a large rectangular cavity 5 for storage of ice and refrigerable materials. A mounting plate 12 having two parallel projecting ears which include a hole for a fastening pin, is attached to the front end of the case, adjacent to the case top edge. The mounting plate 12 provides a means of pivotably attaching an end of the handle 6 to the case 4. A slotted latch plate 14 for bracing an extended handle, and a wheel-axle assembly for supporting the case, complete the list of components that are at attached to the case. The latch plate 14 is made of two opposing curved members made of metal or plastic that each include at least one slot near the lower end of the member. These members may be joined to facilitate their fastening to the case. A standard commercial slotted latch plate may be used where available. As is apparent from FIG. 4, the case assembly is relatively simple, requiring little special manufacture other than molding and forming the case itself.

Figure 5:
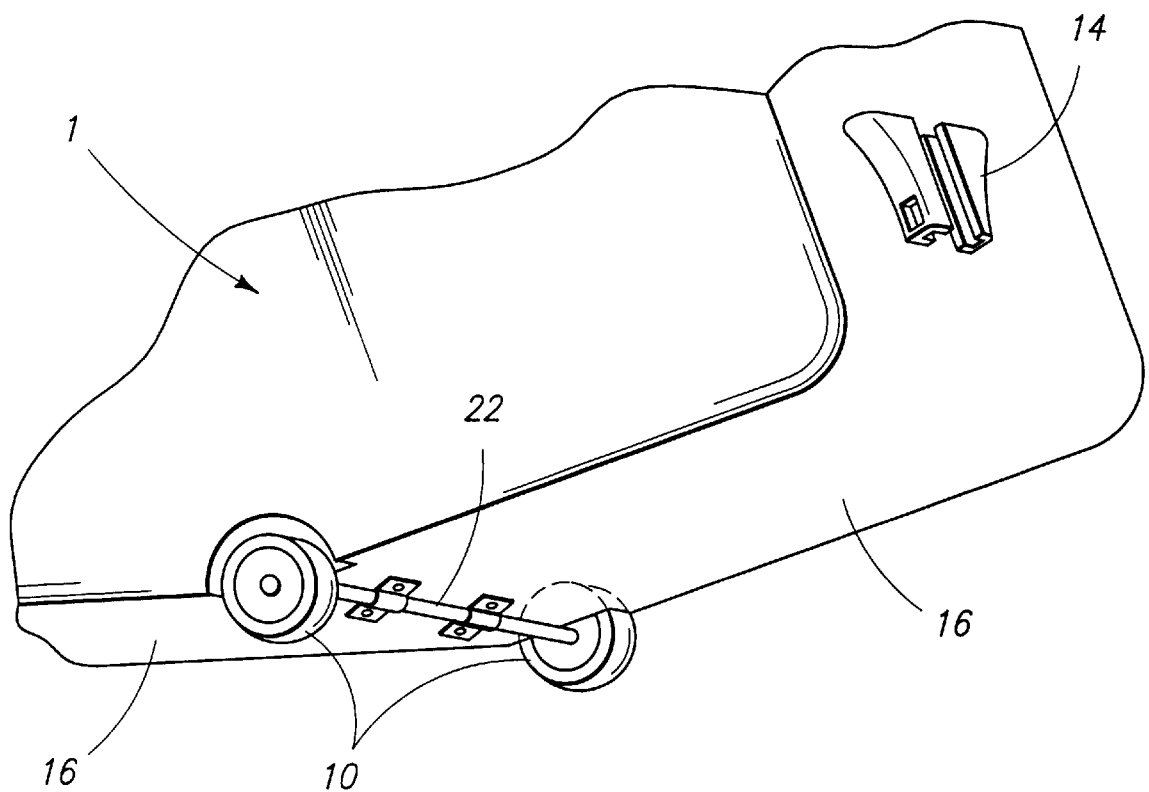
FIG. 5 is a partial perspective view of the bottom of the invention cooler; particularly showing two rubber-tired wheels mounted on an axle attached to the cooler case bottom surface.

In this connection, it is instructive to observe the partial perspective view of the case bottom surface in FIG. 5. Here, an axle 22 holding two rubber tired wheels 10, is fastened by standard metal fastening fixtures to the case bottom surface 16.

Figure 6:
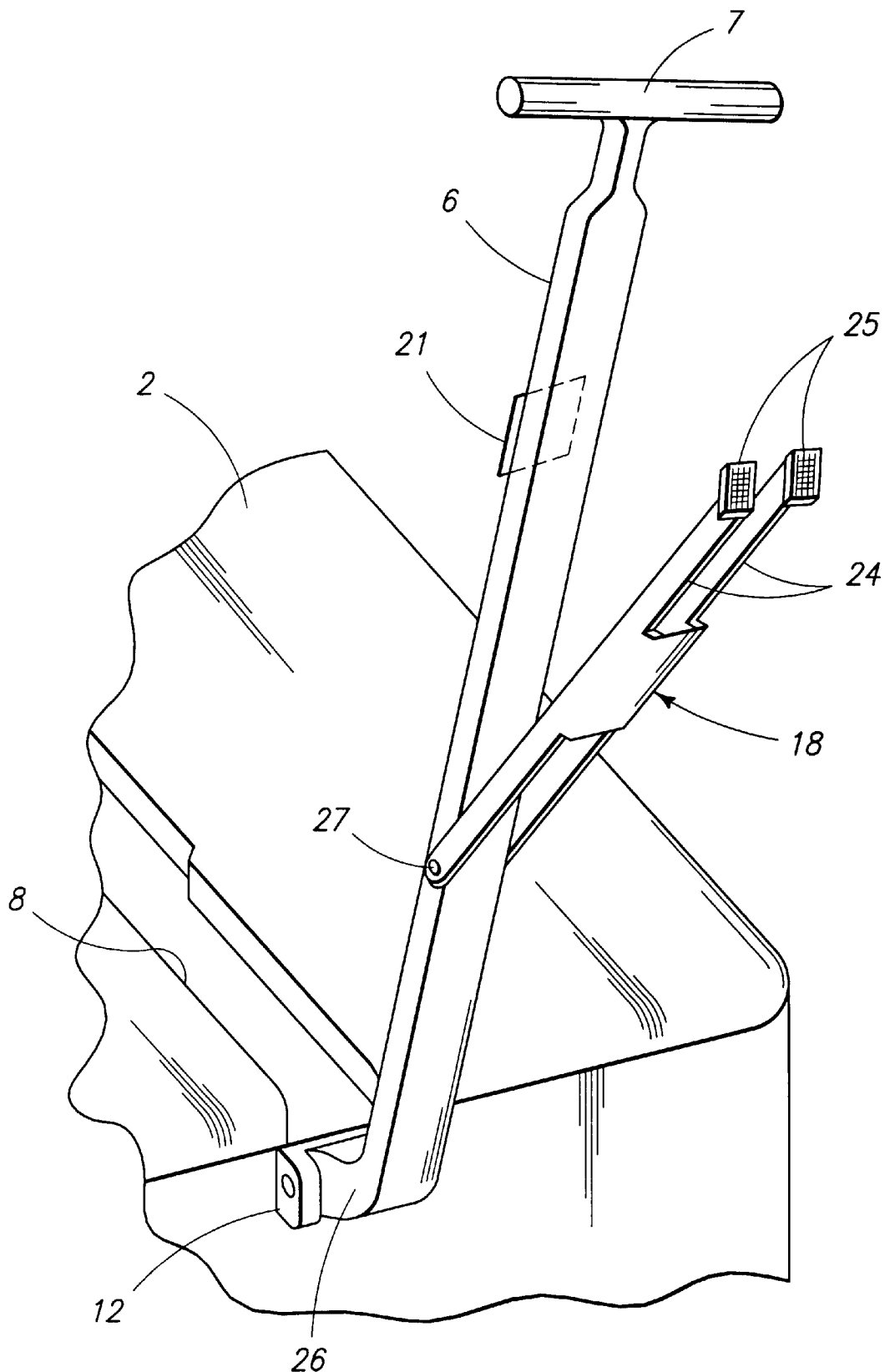
FIG. 6 is a partial perspective view of the front end of the cooler, particularly showing details of the pulling handle and the attached strut assembly that is used to hold the handle rigid.

Refer now to FIG. 6 which shows the handle 6 and its attached supporting strut assembly 18, pivotally attached to a mounting plate 12 located on the front end of the case 4, just below the groove 8 in the lid 2. As depicted, with the strut assembly 18 folded flat against the sides of the handle 6, the handle may now be pivoted forward and stored in the lid groove 8.

The handle 6 is a long rigid metal bar that has a handle grip 7 fastened to one end, and has an arcuately-shaped portion 26 forming its distal end which is attached pivotally with a pin to the mounting plate 12, and thereby to the case 4. A fastening pad 21 made of hook-loop synthetic material is adhered to the surface of the handle facing the lid groove 8, and is located to mate and engage with an opposing fastening pad 20 of the same material that is adhered to the lid groove 8. This provides a means for the handle 6 to be held in a stored position on the cooler lid 2 when desired, and also to be easily disengaged from the cooler lid and erected for pulling when necessary.

The strut assembly 18 pivots on the handle 6 about two-thirds of the handle length down from the grip 7 end on a pivot pin 27. The strut assembly 18 comprises two identical strut members 24 which are plates made of a springy material, and which are joined at their mid-point by a stiffening plate. The stiffening plate is designed to separate the strut members by the handle width plus a small clearance to allow the strut assembly 18 to be folded over the handle for nesting in the groove 8 in the top of the lid 2.

At the free end of each strut member 24 is a portion 25 that is bent outward at an acute angle. These bent portions serve as fastening lips that are used to engage the latching plate 14 which is on the front end of the cooler case below the handle 6.

Figure 7:
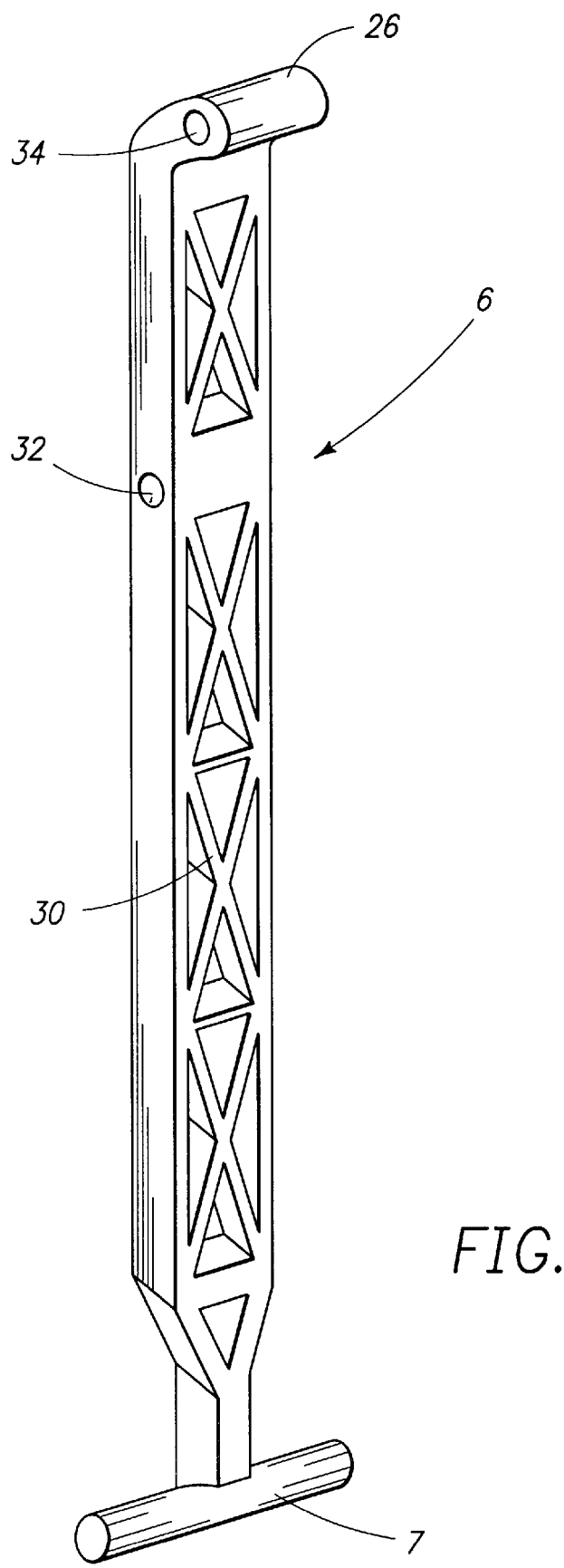
FIG. 7 a perspective elevation view of the cooler handle, particularly showing detail of its anti-torsion construction.

Referring now to FIG. 7, the handle 6 is designed particularly to resist the torsion that may occur during pulling the cooler. The bar portion of the handle is made wide, and includes a plurality of cut-out triangular shaped cavities 30. These cavities are specifically shaped and arranged to reduce handle weight while still maintaining high resistance to torsion. A first hole 32 is bored through the handle for pivotally mounting the strut assembly 18, and a second hole 34 is bored through the arcuate end 26 for attaching to the handle mounting plate 12.

The cooler is light in weight and easy to pull. It is strong enough to store a large quantity of the typical picnic provisions needed for a family, and provides easy access to the cooler contents. Due to its simple construction, it is also low in cost.

From the foregoing description, it is clear that the preferred embodiment of the cooler achieves the objects of the present invention. Various modifications may be apparent to those skilled in the art. These modifications are considered to be within the scope and spirit of the present invention and are encompassed thereby.

Having described the invention, what is claimed is:

1. A pullable, rolling cooler comprising:

(a) a generally rectangular shaped, rigid molded case having an open top, said case having elongate opposing parallel, planar side walls, a planar front end wall, an opposing planar rear end wall, and a V-shaped bottom wall; all said walls being made thick for thermal insulation;

(b) a pair of rubber-tired wheels, rotatably mounted on an axle extending, transversely to said side walls, said axle being fastened to the under surface of said bottom wall at the proximate midway point corresponding to a vertical line through the case center of gravity;

(c) a handle mounting plate, said mounting plate being fastened and centered adjacent to a top edge of said front end wall of said case, said mounting plate having two projecting, parallel opposing ears, said ears each having a hole;

(d) a rigid, metal handle, (e) a pin member for connecting a proximate end of said handle to said handle mounting plate for pivotal movement of said handle between a stored position and an extended position;

(f) means for fixing said handle rigidly in place to the front end wall of said case while in said extend position, said means including a strut assembly that is connected to said handle, and a latch plate assembly which is attached to the front end wall of said case below said mounting plate; said strut assembly comprising two elongate identical strut members made of a springy material which are joined in parallel at their mid-point by a stiffening plate, said stiffening plate separating said strut members by a width of said handle plus clearance; said strut members having proximate ends pivotally fastened to opposing side of said handle; distal ends of said strut members each including a portion permanently bent at an acute angle outwardly therefrom, forming fastening lips said latch plate assembly comprising a pair of opposed vertically extending curved members, each curved member being formed with a recess which becomes narrower in a downwardly extending direction, each curved member having a slot near a lower end for receiving a respective one of said fastening lips when said handle is in said extended position;

(g) a thick, molded rectangular lid that has a width and length which is identical to said case; said lid having a generally planar top surface and a stepped planar bottom surface, said bottom surface having a stepped portion that is sized and shaped to fit closely into the open top of said case to secure said lid on said case; said top surface having a wide, deep groove cut along longitudinal axis of the lid from near one end to a distal end adjacent said handle mounting plate when said lid is in a closed position, said groove being shaped to accommodate in nesting fashion the length of said handle when said handle is in said stored position with said strut assembly attached and folded against the sides of said handle; and (h) means for removably securing said handle within said groove in said lid while in said stored position said handle being movable from said stored position to said extended position by disengaging said handle from said lid, unfolding said strut assembly from said handle, and inserting said fastening lips into said opposed curved members until said fastening lips are received within said slots, thereby readying said cooler for manual pulling by said handle.

2. A cooler according to claim 1, wherein:

said means for removably securing said handle to said groove in said lid includes a first fastener patch of hook-loop synthetic material that is adhered to said groove in said lid, and a mating fastener patch of hook-loop synthetic material that is adhered to said handle, said mating fastener patch being located on said handle to fit immediately over and engage with said first fastener patch when said handle is nested in said groove.

3. A cooler according to claim 1, wherein:

said handle is an elongate, rigid metal bar having a hand grip portion attached to a distal end and an arcuately shaped portion forming its proximate end, said arcuately shaped portion including a transverse through hole bored near its proximate end to received said pin member for pivotally fastening said handle to said mounting plate; said metal bar including a plurality of triangular shaped cavities to reduce handle weight while. maintaining,handle rigidity.

4. A cooler according to claim 1, wherein:

said lid and said case are fabricated from a foamed plastic material having a smooth outer surface.

5. A cooler according to claim 1, wherein:

said lid and said case are fabricated from a light weight composite material.

* * * * *